(12) United States Patent
Okel

(10) Patent No.: US 6,342,560 B1
(45) Date of Patent: Jan. 29, 2002

(54) CHEMICALLY MODIFIED FILLERS AND POLYMERIC COMPOSITIONS CONTAINING SAME

(75) Inventor: Timothy A. Okel, Trafford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/636,711

(22) Filed: Aug. 11, 2000

Related U.S. Application Data

(60) Provisional application No. 60/203,427, filed on May 10, 2000, provisional application No. 60/172,308, filed on Dec. 17, 1999, and provisional application No. 60/149,758, filed on Aug. 19, 1999.

(51) Int. Cl.⁷ .............................. C04B 14/04; C08K 3/34
(52) U.S. Cl. ..................... 524/493; 524/492; 524/442; 524/445; 524/447; 106/468; 106/469; 106/481; 106/482; 523/351
(58) Field of Search ................... 106/481, 482, 106/468, 469; 523/351; 524/442, 445, 447, 482, 493

(56) References Cited

U.S. PATENT DOCUMENTS

| | | | |
|---|---|---|---|
| 3,692,812 A | 9/1972 | Berger | 260/448.2 E |
| 3,768,537 A | 10/1973 | Hess et al. | 152/330 |
| 3,873,489 A | 3/1975 | Thurn et al. | 260/33.6 AQ |
| 3,922,436 A | 11/1975 | Bell et al. | 428/375 |
| 4,076,550 A | 2/1978 | Thurn et al. | 106/288 |
| 4,359,342 A | 11/1982 | Stacy et al. | 523/216 |
| 4,436,847 A | 3/1984 | Wagner | 523/203 |
| 4,704,414 A | 11/1987 | Kerner et al. | 523/213 |
| 5,009,874 A | 4/1991 | Parmentier et al. | 423/335 |
| 5,116,886 A | 5/1992 | Wolff et al. | 523/209 |
| 5,580,919 A | 12/1996 | Agostini et al. | 524/430 |
| 5,705,137 A | 1/1998 | Goerl et al. | 423/335 |
| 5,763,388 A | 6/1998 | Lightsey et al. | 523/212 |
| 5,908,660 A | 6/1999 | Griffith et al. | 427/220 |
| 5,919,298 A | 7/1999 | Griffith et al. | 106/490 |
| 5,985,953 A | 11/1999 | Lightsey et al. | 523/212 |
| 6,013,699 A | 1/2000 | Freeman et al. | 523/212 |
| 6,022,923 A | 2/2000 | Araki et al. | 524/494 |
| 6,033,597 A | 3/2000 | Yatsuyanagi et al. | 252/182.17 |
| 6,051,672 A | 4/2000 | Burns et al. | 528/10 |

FOREIGN PATENT DOCUMENTS

| | | |
|---|---|---|
| EP | 655 480 A2 | 5/1995 |
| EP | 795 579 A1 | 9/1997 |
| EP | 849 320 A1 | 6/1998 |
| EP | 0 849 320 | 6/1998 |
| EP | 0 875 532 | 11/1998 |
| EP | 890 600 A1 | 1/1999 |
| EP | 0 928 818 | 7/1999 |
| EP | 931 812 A1 | 7/1999 |
| JP | 10-316409 A | 12/1998 |
| WO | WO 97/21774 | 6/1997 |
| WO | WO 98/47955 | 10/1998 |
| WO | WO 99/09036 | 2/1999 |

OTHER PUBLICATIONS

Kirk–Othmer, Encyclopedia of Chemical Technology, (4th ed.), vol. 19, J. Wiley and Sons, 1996, pp 881–904.

J.W. Lightsey et al, DSM Copolymer, Inc., "Silica Wet Masterbatch: A New Process for Pre–Dispersion of Silica in Emulsion Polymers", ACS Meeting, Oct. 1997.

A. Krysztafkiewicz, "Modified Silica precipitated in the medium of organic solvents—an active rubber filler", Colloid & Polymer Science, vol. 267, pp 399–408.

*Primary Examiner*—Edward J. Cain
(74) *Attorney, Agent, or Firm*—Carol A. Marmo; Frank P. Mallak

(57) ABSTRACT

Described are fillers, e.g., inorganic oxides, that have been modified to have a carbon content of greater than 1 weight percent, a sulfur content of greater than 0.1 weight percent, a Silane Conversion Index of at least 0.3 and a Standard Tensile Stress @ 300% elongation of 7 or more. Polymeric compositions that contain such modified fillers are also described.

23 Claims, No Drawings

CHEMICALLY MODIFIED FILLERS AND POLYMERIC COMPOSITIONS CONTAINING SAME

CROSS REFERENCE TO RELATED APPLICATIONS

This application claims the benefit of U.S. provisional applications Serial No. 60/203,427, filed May 10, 2000, Ser. No. 60/172,308, filed Dec. 17, 1999 and Ser. No. 60/149,758, filed Aug. 19, 1999.

DESCRIPTION OF THE INVENTION

The present invention relates to chemically modified fillers and the use of such fillers in polymeric compositions. More particularly, this invention relates to particulate or amorphous fillers having minimum carbon and sulfur contents, a minimum Silane Conversion Index and a minimum Standard Tensile Stress @ 300% elongation and polymers, e.g., curable rubber compositions, containing such fillers. Most particularly, this invention relates to a functionalized and hydrophobized filler, hereinafter referred to as a "modified filler", that improves the efficiency of producing polymeric compositions, such as in rubber compounding, and the performance of polymerized or cured products, e.g., tires.

In the production of polymeric compositions, it is common to incorporate fillers to improve the physical properties of the polymer. The surfaces of such fillers are often modified to increase the reactivity and consequently the two and three dimensional coupling of the filler within the polymeric composition. It is conventional in the rubber industry to incorporate carbon black and other reinforcing fillers into natural and synthetic rubber to increase the physical properties of the cured rubber vulcanizate. Fillers used to reinforce such polymeric compositions include natural and synthetic fillers.

One of the principal non-black fillers used in the rubber industry is amorphous precipitated silica. This siliceous filler is used to impart improved tensile strength, tear resistance and abrasion resistance to the rubber vulcanizate. Silica fillers are also used in combination with carbon blacks to obtain maximum mileage in passenger vehicle tires and off-the-road tires, e.g., tires for mining and logging operations and for road-building equipment. Such applications have become well established. When used as the sole reinforcing filler, silica fillers that are not well dispersed and/or coupled in the rubber do not provide the overall improved performance obtained by the use of carbon blacks alone. This is observed most readily in rubber vulcanizes used for tires, e.g., tire treads.

Various coupling agents, e.g., titanates, zirconates and silanes, have been suggested for use with fillers when such fillers are incorporated into polymeric compositions, e.g., rubber, in order to improve the performance of the rubber vulcanizate. Among the various organosilane coupling agents suggested for such use are the bis(alkoxysilylalkyl) polysulfides, e.g., 3,3'-bis(triethoxysilylpropyl)tetrasulfide. It has been reported that the use of appropriate amounts of such coupling agents, particularly 3,3'-bis (triethoxysilylpropyl)tetrasulfide, in siliceous filler-reinforced synthetic rubbers provides at least equivalent performance to carbon black-reinforced synthetic rubbers in several key physical properties such as 300% modulus, tensile strength and abrasion resistance.

The high cost of bis(alkoxysilylalkyl)polysulfides, and the time and energy required to mix them into polymeric compositions have deterred the more general use of siliceous fillers as the principal reinforcing filler in large volume applications. U.S. Pat. No. 4,436,847 describes increasing the efficiency of silane coupling agents, e.g., bis (alkoxysilylalkyl)polysulfide coupling agents, by using an alkoxysilane in combination with the silane to form a coupling composition. In one specific embodiment described in the '847 patent, the silane coupling composition is formulated with the siliceous filler in a suitable non-reactive liquid that is chemically inert with respect to the coupling composition and siliceous filler to prepare a rubber compounding additive, i.e., a silica-silane concentrate.

U.S. Pat. No. 5,116,886 describes a two-step process in which the surface of natural or synthetic, oxide or silicate fillers is modified by using certain organosilicon compounds. In the first step, the organosilicon compound is mixed intensely with the filler at a temperature below 60° C. In the second step, the homogenous mixture is subjected to a temperature of from 60 to 160° C. to complete the surface modification of the filler.

U.S. Pat. No. 5,908,660 also describes a two-step method for the preparation of hydrophobic silica. In the first step, an aqueous suspension of precipitated silica is contacted with an organosilicon compound in the presence of a catalytic amount of an acid to effect hydrophobizing of the precipitated silica. In the second step, the aqueous suspension of the hydrophobic precipitated silica is contacted with a water-immiscible organic solvent at a solvent to silica weight ratio greater than 5:1 to effect separation of the hydrophobic precipitated silica from the aqueous phase.

It has now been discovered that a modified filler, e.g., a particulate or amorphous inorganic oxide, that is characterized by a carbon content of greater than 1 weight percent, a sulfur content of greater than 0.1 weight percent, a Silane Conversion Index (described hereinafter) of at least 0.3 and a Standard Tensile Stress @ 300% elongation (also described hereinafter) of 7 or more can be prepared. The process described in U.S. Pat. No. 5,908,660 may be improved and used to produce the modified filler of the present invention by utilizing a certain combination of functionalizing and hydrophobizing agents in an aqueous suspension of inorganic oxide having a pH of 2.5 or less and treating the acidic aqueous suspension of modified fillers with acid neutralizing agents to increase the pH of the suspension to a range of from 3.0 to 10.

As used herein, a functionalizing agent is a reactive chemical which can cause an inorganic oxide to be covalently bonded to the polymeric composition in which it is used. A hydrophobizing agent is a chemical which can bind to and/or be associated with an inorganic oxide to the extent that it causes a reduction in the affinity for water of the inorganic oxide while increasing the inorganic oxide's affinity for the organic polymeric composition in which it is used.

The aforementioned Standard Tensile Stress @ 300% elongation (STS@300%) of at least 7 or greater indicates improved reinforcement of the rubber composition. Improved reinforcement translates into an improvement in the mechanical durability of the product which is evidenced by increased tear strength, hardness and abrasion resistance. In addition to the improved properties, the modified filler has the benefit of requiring less time and energy to get incorporated into the polymeric composition.

DETAILED DESCRIPTION OF THE INVENTION

Other than in the operating examples, or where otherwise indicated, all numbers expressing quantities, ratios, ranges, etc. used herein are to be understood as modified in all instances by the term "about".

The modified filler of the present invention may be produced by any method that results in such a filler, i.e., an inorganic oxide, having a carbon content of greater than 1 weight percent, preferably, at least 1.5 weight percent, and more preferably, at least 2.0 weight percent; a sulfur content of greater than 0.1 weight percent, preferably, at least 0.3 weight percent, and more preferably, at least 0.6 weight percent; a Silane Conversion Index, of at least 0.3, preferably, at least 0.4, and most preferably, at least 0.5 and a Standard Tensile Stress @ 300% elongation of at least 7.0, preferably, at least 7.5 and more preferably at least 8.0. The modified filler of the present invention may also be characterized by a modified Brunauer-Emmett-Teller (BET), i.e., a single point surface area, of from 20 to 350 m$^2$/g, preferably from 40 to 300 m$^2$/g and most preferably of from 100 to 200 m$^2$/g, a pH of from 5 to 10, preferably from 5.5 to 9.5, more preferably from 6.0 to 9.0 and most preferably, a pH of from 6.0 to 7.5 or the pH of the product may range between any combination of these values, inclusive of the recited ranges; and a Soxhlet Extractable percent carbon of less than 30 percent, preferably less than 25 percent and more preferably less than 20 percent, e.g., 15 percent. The methods for determining the aforestated characteristics of the modified inorganic oxide are described in Example 9.

The filler used to prepare the modified filler of the present invention is an inorganic oxide defined herein as any inorganic particulate or amorphous solid material which possesses either oxygen (chemisorbed or covalently bonded) or hydroxyl (bound or free) at its exposed surface. In addition, the inorganic oxide is a material which is suitable for use in the various molding, compounding or coating processes including injection molding, lamination, transfer molding, compression molding, rubber compounding, coating (such as dipping, brushing, knife coating, roller coating, silk screen coating, printing, spray coating and the like), casting, and the like.

The inorganic oxide or mixture of 2 or more inorganic oxides used to produce the modified filler of the present invention may be natural or synthetic. Such fillers include oxides of the metals in Periods 2, 3, 4, 5 and 6 of Groups Ib, IIb, IIIa, IIIb, IVa, IVb (except carbon), Va, VIa, VIIa and VIII of the Periodic Table of the Elements in *Advanced Inorganic Chemistry: A Comprehensive Text* by F. Albert Cotton et al, Fourth Edition, John Wiley and Sons, 1980. Among the natural silicates, kaolines or clays are especially suitable. However, kieselguhr or diatomaceous earths can also be used. Aluminum oxide, aluminum hydroxide or aluminum trihydrate and titanium dioxide, which can be obtained from natural deposits, can be named by way of example as fillers. Especially suitable synthetic fillers are aluminosilicates, silicates, pyrogenic, colloidal and precipitated silicas.

The term "aluminosilicates" can be described as natural or synthetic materials where the silicon atoms of a silicon dioxide are partially replaced, or substituted, either naturally or synthetically, by aluminum atoms. For example, 5 to 90, alternatively 10 to 80 percent of silicon atoms of a silicon dioxide might be replaced, or substituted, naturally or synthetically, by aluminum atoms to yield an aluminosilicate. A suitable process for such preparation might be described, for example, as by a coprecipitation by pH adjustment of a basic solution, or mixture, of silicate and aluminate also, for example, by a chemical reaction between $SiO_2$, or silanols on the surface of a silicon dioxide, and $NaAlO_2$. For example, in such a coprecipitation process, the synthetic coprecipitated aluminosilicate may have 5 to 95 of its surface composed of silica moieties and, correspondingly, 95 to 5 percent of its surface composed of aluminum moieties.

Examples of natural aluminosilicates include Muscovite, Beryl, Dichroite, Sepiolite and Kaolinire. Examples of synthetic aluminosilicates include Zeolite and those which might be represented by formulas such as, for example, $[(Al_2O_3)_x(SiO_2)_y.(H_2O)_z]$; $[(Al_2O_3)_x(SiO_2)_y YO]$; wherein Y is magnesium or calcium.

Preferably, the inorganic oxide used to produce the modified filler of the present invention is aluminosilicate, colloidal silica, precipitated silica or mixtures thereof, and most preferably it is a precipitated silica of the type commonly employed for compounding with rubber. Various commercially available silicas that may be considered for use in this invention include silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

The precipitated silica used to produce the modified filler of the present invention may be produced, for example, by acidic precipitation from solutions of silicates, e.g., sodium silicate. The method of preparing the precipitated silica is not limiting on the present invention and will depend upon the desired properties of the silica, such as surface area and particle size required for a given application.

The BET surface area of the precipitated silica used in preparing the modified silica of the present invention will generally be within a range of from 50 m$^2$/g to 1000 m$^2$/g, and will preferably be within a range of from 100 m$^2$/g to 500 m$^2$/g.

The precipitated silica used to form the modified silica may be in the form of an aqueous suspension from production stages that precede the drying step, such as a slurry formed during precipitation or as a reliquefied filter cake. The suspension can also be formed by re-dispersing dried silica into an aqueous and/or organic solvent. The concentration of hydrophilic precipitated silica in the aqueous and/or organic suspension is not critical and can be within a range of about 1 to 90 weight percent. Preferably, the concentration of hydrophilic precipitated silica is within a range of from 1 to 50 weight percent, and more preferably within a range of from 1 to 20 weight percent.

The Silane Conversion Index is defined by the equation $T^3/(T^1+T^2+T^3)$. The values for $T^1$, $T^2$ and $T^3$ are determined by solid state $^{29}Si$ NMR and represent reacted silane units. The Silane Conversion Index provides an indication of the degree of reaction or crosslinking of the silanes on adjacent Si atoms and with each other. The higher the index number, the greater the amount of crosslinking amongst the silane, silica surface and adjacent silanes. $T^1$ represents a silane unit chemically bonded at one site to either the silica surface or another silane. $T^2$ represents a silane unit chemically bonded at two sites to either a Si atom on the silica surface and to one adjacent silane, two adjacent silanes or to two adjacent surface Si atoms, i.e., partially crosslinking structures. $T^3$ represents a silane unit chemically bonded at three sites to either a Si atom on the silica surface and two adjacent silanes, two Si atoms and one silane or three silane units.

It is believed that an Organometallic Reactant Conversion Index, comparable to the Silane Conversion Index, can be developed and used by those skilled in the coupling agent art to provide an indication of the degree of reaction or crosslinking of zirconates and/or titanates (alone or in combination with silanes) with the inorganic oxide and themselves.

The Standard Tensile Stress @ 300% elongation is determined using a Standard Compounding Protocol. The Standard Compounding Protocol described herein does not include the addition of free or unbounded coupling agents to the rubber batch. This is an important distinction since others have reported 300% Modulus values greater than 7.0. See U.S. Pat. No. 5,705,137. In this patent, Silane X 50-S, a silica/rubber coupling agent, was added during rubber compounding. Typically, the addition of such coupling agents to a rubber batch requires more time for mixing by the compounder.

The polymeric compositions, e.g., plastics and/or resin, in which the modified filler can be added include essentially any plastic and/or resin. Included in this definition are rubber compounds. Such polymers are described in Kirk Othmer *Encyclopedia of Chemical Technology*, Fourth Edition, 1996, Volume 19, pp 881–904, which description is herein incorporated by reference. The modified filler may be admixed with the polymer or the polymerizable components thereof while the physical form of the polymer or polymerizable components is in any liquid or compoundable form such as a solution, suspension, latex, dispersion, and the like. The polymeric compositions containing the modified filler may be milled, mixed, molded and cured, by any manner known to the art, to form a polymeric article having dispensed therein 10 to 150 parts per 100 parts polymer of modified filler. Suitable polymers include, by way of example, thermoplastic and thermosetting resins, rubber compounds and other polymers having elastomeric properties.

The polymers may be alkyd resins, oil modified alkyd resins, unsaturated polyesters, natural oils, (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, mathacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylenevinyl acetate copolymers, ethylene-acrylic acid copolymers, ethyleneacrylate copolymers), organic rubbers, silicone greases, resins and rubbers and the like.

The amount of modified filler that may be used in polymeric composition may range from 5 up to 70 weight percent, based on the total weight of the plastic composition. For example, the typical amount of modified filler used in ABS (acrylonitrile-butadiene-styrene) copolymer is from 30 to 60 weight percent, acrylonitrile-styrene-acrylate copolymer is 5 to 20 weight percent, aliphatic polyketones is 15 to 30 weight percent, alkyds resins (for paints and inks) is 30 to 60 weight percent, thermoplastic olefins is 10 to 30 weight percent, epoxy resins is from 5 to 20 weight percent, ethylene vinylacetate copolymer is up to 60 weight percent, ethylene ethyl acetate copolymer is up to 80 weight percent, liquid crystalline polymers (LCP) is 30 to 70 weight percent, phenolic resins is 30–60 weight percent and in polyethylene the amount is usually greater than 40 weight percent.

In particular, organic rubber and silicone rubber are preferred. Examples of such rubbers include natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinyl-pyridine and its derivatives, acrylonitrile, isobutylene and alkyl-substituted acrylates such as methylmethacrylate. Examples include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530,959; 4,616,065; 4,748,199; 4,866,131; 4,894,420; 4,925,894; 5,082,901; and 5,162,409.

Other suitable organic polymers are copolymers of ethylene with other high alpha olefins such as propylene, butene-1 and pentene-1 and a diene monomer. The organic polymers may be block, random, or sequential and may be prepared by emulsion (e.g. e-SBR) or solution polymerization processes (e.g. s-SBR). Additional polymers which may be used include those which are partially or fully functionalized including coupled or star-branched polymers. Additional specific examples of functionalized organic rubbers include polychloroprene, chlorobutyl and bromobutyl rubber as well as brominated isobutylene-co-paramethylstyrene rubber. The preferred organic rubbers are polybutadiene, s-SBR and mixtures thereof.

Examples of silicone rubbers include organic polysiloxane compositions in which the organic polysiloxane is linear or branched, and optionally may contain, in addition to the hydrocarbon groups, certain reactive groups such as for example, hydroxyl, hydrolyzable groups, alkenyl groups such as vinyl, hydrogen, fluoro, and phenyl. Further examples are given in U.S. Pat. No. 5,009,874 at column 5, line 27 through column 6, line 23, the disclosure of which is, in its entirety, incorporated herein by reference.

Preferably, the polymeric composition is a curable rubber. The term "curable rubber" is intended to include both natural rubber and its various raw and reclaim forms as well as various synthetic rubbers. For example, curable ruber could include combinations of SBR and butadiene rubber (BR), SBR, BR and natural rubber and any other combination of materials previously described as organic rubber. In the description of this invention, the terms "rubber", "elastomeric" and "rubbery elastomer" may be used interchangeably, unless indicated otherwise. The terms "rubber composition", "compounded rubber" and "rubber compound" are used interchangeably to refer to rubber which has been blended or mixed with various ingredients and materials and such terms are well known to those having skill in the rubber mixing or rubber compounding art.

The modified filler of the present invention may be prepared by using step A alone or both steps A and B for preparing hydrophobic silica and fumed silica disclosed in U.S. Pat. Nos. 5,908,660 and 5,919,298, respectively, which disclosures are incorporated herein by reference, with the following changes. The amount of acid used results in a pH of 2.5 or less in the aqueous suspension, preferably, a pH of 2.0 or less, and more preferably, a pH of 1.0 or less and most preferably a pH of 0.5 or less; the modifying chemical used is a combination of bis(alkoxysilylalkyl)polysulfide and a non-sulfur containing organometallic compound, which is referred to hereinafter as non-sulfur organometallic compound, in a weight ratio of the bis(alkoxysilylalkyl) polysulfide to the non-sulfur organometallic compound of at least 0.05:1, preferably from 0.05:1 to 10:1, more preferably, from 0.1:1 to 5:1, and most preferably, from 0.2:1 to 2:1, e.g., from 0.5:1 to 1:1, or the weight ratio may range between any combination of these values, inclusive of the recited values; and after the chemical treatment reaction is completed, the acidity (either added or generated in situ by the hydrolysis of halogenated organometallic compounds) is neutralized. Typically after completing the chemical treatment reaction, the pH of the resulting aqueous suspension is increased to a pH range of from 3 to 10. The neutralizing agents can be of any type typically used to increase the pH of an acidic solution as long as the properties of the modified filler are not adversely effected. Suitable neutralizing agents include sodium hydroxide, potassium hydroxide, ammonium hydroxide and sodium bicarbonate. Neutralization of the modified filler may also be accomplished by adding gaseous ammonia to the aqueous solution during spray drying.

The acid used in step (A) may be of many types, organic and/or inorganic. The preferred acid catalyst is inorganic. Examples of suitable acid catalysts include hydrochloric acid, hydrobromic acid, hydroiodic acid, sulfuric acid, nitric acid, phosphoric acid, and benzenesulfonic acid. One acid catalyst or a mixture of two or more acid catalysts may be employed as desired. When the organometallic reactant is, for example, a chlorosilane, the catalytic amount of the acid may be generated in situ by hydrolysis of the chlorosilane or the reaction of the chlorosilane directly with hydroxyls of the inorganic oxide.

The temperature at which step (A) is conducted is not critical and is usually within the range of from 20° C. to 250° C., although somewhat lesser or somewhat greater temperatures may be used when desired. The reaction temperature will depend on the reactants used, e.g., the organometallic compound(s), the acid and, if used, a co-solvent. Preferably, step (A) is conducted at temperatures in the range of from 30° C. to 150° C., although Step (A) can be conducted at the reflux temperature of the slurry used in step (A) when this is desired.

In the aforedescribed reaction, the modifying chemical or coupling agent may be a combination of functionalizing agent(s) in place of bis(alkoxysilylalkyl)polysulfide and hydrophobizing agent(s) in place of a non-sulfur organometallic compound. The combination of functionalizing and hydrophobizing agents may be used in the same weight ratios specified for the combination of bis(alkoxysilylalkyl) polysulfide to the non-sulfur organometallic compound. Examples of reactive groups that the functionalizing agent may contain include, but are not limited to vinyl, epoxy, glycidoxy and (meth)acryloxy. Sulfide, polysulfide and mercapto groups may also be the reactive groups of the functionalizing agent provided they are not associated with the reactants represented by chemical formulae I and VII, included herein. As the hydrophobizing agents, materials include but are not limited to chemicals such as natural or synthetic fats and oils and the non-sulfur organometallic compounds represented by chemical formulae II, III, IV, V and mixtures of such hydrophobizing agents.

The initial step of contacting the acidic aqueous suspension of inorganic oxide with a combination of bis (alkoxysilylalkyl)polysulfide and non-sulfur organometallic compound, preferably a non-sulfur organosilicon compound, may further include adding a water miscible solvent in amounts sufficient to facilitate their reaction with the inorganic oxide. The solvent acts as a phase transfer agent speeding up the interaction of the combination of hydrophobic sulfur and non-sulfur organometallic compounds with the hydrophilic inorganic oxide. When used, the amount of the water-miscible organic solvent will typically comprise at least 5 weight percent of the aqueous suspension, more preferably from 15 to 50 weight percent and most preferably from 20 to 30 weight percent of the aqueous suspension or the weight percent may range between any combination of these values, inclusive of the recited values. Suitable water-miscible solvents include, for example, alcohols such as ethanol, isopropanol and tetrahydrofuran. Preferably, isopropanol is used as the water-miscible organic solvent.

A surfactant may also be used in the initial step, either in combination with the water-miscible organic solvent or in place of the water-miscible organic solvent, in an amount sufficient to facilitate the chemical modification of the inorganic oxide by the bis(alkoxysilylalkyl)polysulfide and non-sulfur organometallic compound. The surfactant may be nonionic, anionic, cationic, amphoteric or a mixture of such surfactants provided that it does not have an adverse effect on the performance of the resulting chemically modified inorganic oxide for its intended use. Typically, when used, the surfactant is employed at a level of from 0.05 to 10 weight percent of the aqueous suspension, more preferably, from 0.1 to 5 weight percent, and most preferably from 0.1 to 3 weight percent or the weight percent may range between any combination of these values, inclusive of the recited values.

Representative examples of suitable surfactants include alkylphenolpolyglycol ethers, e.g., p-octylphenolpolyethyleneglycol (20 units) ether, p-nonylphenolpolyethyleneglycol (20 units) ether, alkylpolyethyleneglycol ethers, e.g., dodecylpolyethyleneglycol (20 units) ether, polyglycols, e.g., polyethyleneglycol 2000, alkyltrimethylammonium salts, e.g., cetyltrimethylammonium chloride (or bromide), dialkyldimethylammonium salts, e.g., dilauryldimethylammonium chloride, alkylbenzyltrimethylammonium salts, alkylbenzenesulfonates, e.g., sodium p-dodecylbenzenesulfonate, sodium p-nonylbenzenesulfonate, alkylhydrogen sulfates, e.g., lauryl hydrogen sulfate, and alkyl sulfates, e.g., lauryl sulfate. The surfactant may also be, for example, a polysiloxane polymer or copolymer having an allyl endblocked polyethylene oxide.

Bis(alkoxysilylalkyl)polysulfides used to produce the modified fillers of the present invention are described in U.S. Pat. Nos. 3,873,489 and 5,580,919, which disclosures are incorporated herein by reference, and are represented by the following formula I:

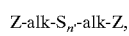

in which alk is a divalent hydrocarbon radical having from 1 to 18, preferably 1 to 6, and more preferably, 2 to 3, carbon atoms; n' is a whole number of 2 to 12, preferably 2 to 6 and more preferably 3 to 4; and Z is:

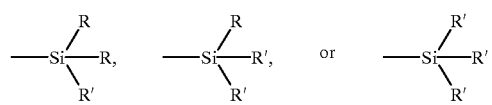

wherein R is an alkyl group having from 1 to 4 carbon atoms or phenyl, and R' is an alkoxy group having from 1 to 8, preferably 1 to 4, more preferably 1 to 2, carbon atoms, a cycloalkoxy group with from 5 to 8 carbon atoms, or a straight or branched chain alkylmercapto group with from 1 to 8 carbon atoms. The R and R' groups can be the same or different. The divalent alk group can be straight or branched chain, a saturated or unsaturated aliphatic hydrocarbon group or a cyclic hydrocarbon group. The high purity organosilane disulfides disclosed in U.S. Pat. No. 5,580,919 require that 80 percent of n' in formula I is 2.

Exemplification of the bis(alkoxysilylalkyl)-polysulfides include: the bis(2-trialkoxysilylethyl)-polysulfide in which the trialkoxy group is trimethoxy, triethoxy, tri(methylethoxy), tripropoxy, tributoxy, etc. up to trioctyloxy and the polysulfide is the di-, tri-, tetra-, penta-, and hexasulfide. The corresponding bis(3-trialkoxysilylpropyl)-, bis(3-trialkoxysilylisobutyl), -bis(4-trialkoxysilylbutyl)-, etc. up to bis(6-trialkoxysilylhexyl)polysulfide can also be used. Preferred are the relatively simply constructed organosilanes including the bis(3-trimethoxy-, -triethoxy-, and -tripropoxysilylpropyl)polysulfide; namely, the di-, tri- and tetrasulfides.

Specific examples of such bis (alkoxysilylalkyl) polysulfides are described in column 6, lines 5–55 of the aforesaid U.S. Pat. No. 3,873,489 and in column 11, lines 11–41 of U.S. Pat. No. 5,580,919. Representative examples of such compounds are: 3,3'-bis(trimethoxysilylpropyl) disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl) hexasulfide, and 3,3'-bis(trioctoxysilylpropyl)tetrasulfide and mixtures thereof. The most preferred compound is 3,3'-bis(triethoxysilylpropyl)tetrasulfide (TESPT).

TESPT is available under the trade name Si-69 from Degussa Corp. It is reported to be a mixture of 3,3'-bis(triethoxysilylpropyl)monosulfide, 3,3'-bis(triethoxysilylpropyl)disulfide, 3,3'-bis(triethoxysilylpropyl)trisulfide, 3,3'-bis(triethoxysilylpropyl)tetrasulfide and higher sulfide homologues having an average sulfide of 3.5.

The non-sulfur organometallic compounds that may be used to produce the modified filler of the present invention may be at least one non-sulfur organometallic compound or a mixture of non-sulfur organometallic compounds selected from the group consisting of organometallic compound(s) represented by formula II:

$$R^1_a MX_{(4-a)} \qquad \text{II}$$

organometallic compound(s) represented by formula III:

$$R^2_{2c+2}Si_cO_{(c-1)} \qquad \text{III}$$

organometallic compound(s) represented by the formula IV:

$$R^3_{2d}Si_dO_d \qquad \text{IV}$$

and organometallic compound(s) represented by formula V:

$$(R^2_3Si)_k NR^4_{(3-k)} \qquad \text{V}$$

wherein each M is independently silicon, titanium or zirconium; each $R^1$ is independently a hydrocarbon group of from 1 to 18 carbon atoms or $R^1$ can be an organofunctional hydrocarbon group of from 1 to 12 carbon atoms where, for example the functionality is amino, carboxylic acid, carbinol ester, or amido; each X is independently selected from the group consisting of halogen, amino, alkoxy groups of from 1 to 12 carbon atoms and acyloxy groups of from 1 to 12 carbon atoms, a is the integer 1, 2 or 3; each $R^2$ is independently halo, hydroxy, or a hydrocarbon group containing from 1 to 18 carbon atoms with the proviso that at least 50 mole percent of the $R^2$ substituents are hydrocarbon groups containing from 1 to 18 carbon atoms, c is an integer from 2 to 10,000; each $R^3$ is independently halo, hydroxy, or a hydrocarbon group containing from 1 to 18 carbon atoms and d is an integer from 3 to 20; each $R^4$ is independently hydrogen or a hydrocarbon group containing from 1 to 18 carbon atoms and k is 1 or 2; and the halogen or (halo) groups are selected from chloro, bromo, iodo or fluoro. In the definition of the substituents shown in formulae II, III, IV and V, like symbols have the same meaning unless stated otherwise.

In formula II each $R^1$ can be a saturated or unsaturated monovalent hydrocarbon group or a substituted or non-substituted monovalent hydrocarbon group. $R^1$ can be, for example, alkyl groups such as methyl, ethyl, propyl, iso-propyl, iso-butyl, t-butyl, n-butyl, pentyl, hexyl, heptyl, octyl, nonyl, decyl, and dodecyl; alkenyl groups such as vinyl, allyl, and hexenyl; substituted alkyl group such as chloromethyl, 3,3,3-trifluoropropyl, and 6-chlorohexyl; cycloalkyl groups, such as cyclohexyl and cyclooctyl; aryl groups such as phenyl and naphthyl; and substituted aryl groups such as benzyl, tolyl and ethylphenyl.

When X is a halogen in formula II, it is preferred that the halogen be chloro. When X is an alkoxy group, X may be, for example, methoxy, ethoxy, and propoxy. When X is an acyloxy group, X may be, for example, acetoxy. More preferred is when each X is selected from the group consisting of chloro and methoxy.

The viscosity of the aforedescribed organometallic compounds is not limiting and can range from that of a fluid to a gum. Generally, higher molecular weight organometallic compounds should be cleaved by the acidic conditions of the chemical modification step allowing them to react with the hydrophilic inorganic oxide.

In formulae III, IV and V each $R^2$, $R^3$, and $R^4$ can be the same as the hydrocarbon groups described for $R^1$. For purposes of the present invention, when the organometallic reactant is an organosilicon reactant, the silicon is considered to be a metal.

Preferably, the non-sulfur organometallic compound(s) is represented by formulae II, III, IV, V or a mixture of said organometallic compounds wherein each M is silicon. More preferably, the non-sulfur organometallic is represented by formula II wherein $R^1$ is $C_1$–$C_6$ alkyl, X is chloro and a is 2.

Examples of useful organosilicon compounds include, but are not limited, to compounds and mixtures of compounds selected from the group consisting of diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, trimethylmethoxysilane, trimethylethoxysilane, methyltrichlorosilane, methyltrimethoxysilane, methyltriethoxysilane, hexamethyldisiloxane, hexenylmethyldichlorosilane, hexenyldimethylchlorosilane, dimethylchlorosilane, dimethyldichlorosilane, dimethyldimethoxysilane, dimethyldiethoxysilane, hexamethyldisilazane, trivinyltrimethylcyclotrisilazane, polydimethylsiloxanes comprising 3 to about 20 dimethylsiloxy units and trimethylsiloxy or hydroxydimethylsiloxy endblocked poly(dimethylsiloxane) polymers having an apparent viscosity within the range of from 1 to 1,000 mPa·s at 25° C.

Examples of organotitanium compounds that may be used include, but are not limited to, tetra($C_1$–$C_{18}$)alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti($CH_2$Ph)$_3$(N$C_5H_{10}$)] and [Ti($CH_2$SiMe$_3$)$_2$(NEt$_2$)$_2$]

Examples of organozirconium compounds that may be used include, but are not limited to, tetra($C_1$–$C_{18}$)alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv). Zirconium compounds similar to those described above for the organotitanium compounds and vice-versa are also contemplated.

The amount of bis(alkoxysilylalkyl)polysulfide and non-sulfur organometallic compound used in the aforedescribed chemical modification process is that amount which is sufficient to produce a modified filler characterized by a carbon content of greater than 1 weight percent, a sulfur content of greater than 0.1 weight percent, a Silane Conversion Index of at least 0.3 and a Standard Tensile Stress @ 300% elongation of at least 7.0. Such an amount is referred to herein as a coupling amount, i.e., an amount sufficient to bind to the filler and enable the now modified filler to bind to the polymeric composition.

The weight ratio of bis(alkoxysilylalkyl)-polysulfide to organometallic compound will vary from at least 0.05:1, preferably, from 0.05:1 to 10:1, more preferably, from 0.1:1 to 5:1, and most preferably, from 0.2:1 to 2:1, e.g., from 0.5:1 to 1:1 or the weight ratio may range between any combination of these values, inclusive of the recited ranges. The individual organometallic reactants may be added together or sequentially in any order. It is preferred that the organometallic reactants be added in an amount that provides an excess of organometallic units in relation to the hydroxyl groups available on the inorganic oxide particles for reaction. The upper limit of the amount of organometallic reactants added to the process is not critical. Excess bis(alkoxysilylalkyl)polysulfide and organometallic compound can be removed by filtration, distillation, washing with a solvent, or other known separation techniques.

In another embodiment, the bis(alkoxysilylalkyl)-polysulfide reactant may be replaced by a combination of a bis(alkoxysilylalkyl)polysulfide and a different sulfur-containing organometallic compound, in a weight ratio of bis(alkoxysilylalkyl)polysulfide to sulfur-containing organometallic compound of from at least greater than 1:1, e.g., 1.01:1. The ratio may range from 1.01:1 to 100:1, preferably from 5:1 to 50:1 and more preferably from 10:1 to 30:1 or the weight ratio may range between any combination of these values, inclusive of the recited values. Any sulfur-containing organometallic compound (other than the bis(alkoxysilylalkyl)polysulfide represented by formula I), that functions as a coupling agent in the vulcanization of a filler containing rubber, is useful.

Examples of useful sulfur-containing organometallic compounds include mercaptoorganometallic reactants that may be represented by the following graphic formula VII:

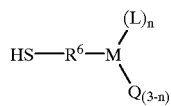

VII wherein M is silicon, L is halogen or —$OR^7$, Q is hydrogen, $C_1$–$C_{12}$ alkyl, or halosubstituted $C_1$–$C_{12}$ alkyl, $R^6$ is $C_1$–$C_{12}$ alkylene, $R^7$ is $C_1$–$C_{12}$ alkyl or alkoxyalkyl containing from 2 to 12 carbon atoms, said halogen or (halo) groups being chloro, bromo, iodo or fluoro, and n is 1, 2 or 3. $R^6$ is preferably $C_1$–$C_3$ alkylene e.g., methylene, ethylene, and propylene, $R^7$ is preferably $C_1$–$C_4$ alkyl, more preferably methyl and ethyl, L is preferably —$OR^6$, and n is preferably 3. Mercaptoorganometallic reactants having two mercapto groups may also be used.

Mercaptoorganometallic compounds in which the mercapto group is blocked, i.e., the mercapto hydrogen atom is replaced by another group, may also be used. The blocked mercaptoorganometallic compounds may have an unsaturated heteroatom or carbon bound directly to sulfur via a single bond. Examples of specific blocking groups include thiocarboxylate ester, dithiocarbamate ester, thiosulfonate ester, thiosulfate ester, thiophosphate ester, thiophosphonate ester, thiophosphinate ester, etc.

When reaction of the mixture to couple the filler to the polymer is desired, a deblocking agent is added to the mixture to deblock the blocked mercaptoorganometallic compound. If water and/or alcohol are present in the mixture, a catalyst, e.g., tertiary amines, Lewis acids or thiols, may be used to initiate and promote the loss of the blocking group by hydrolysis or alcoholysis to liberate the corresponding mercaptoorganometallic compounds. Procedures for preparing and using such compounds, e.g., blocked mercaptosilanes, are disclosed in PCT application WO 99/09036. Other procedures for preparing blocked mercaptosilanes are disclosed in U.S. Pat. Nos. 3,692,812 and 3,922,436, which patents are incorporated herein by reference.

Examples of useful mercaptoorganometallic compound(s) include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropylmethyldimethoxysilane and mixtures thereof. The most preferred compounds are mercaptopropyltrimethoxysilane, mercaptopropyltriethoxysilane or mixtures thereof.

Examples of useful blocked mercaptosilanes include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propylmethylthiosulfate, 3-triethoxysilyl-1-propyltoluenethiosulfonate and mixtures thereof.

After the chemical modifying process is completed, the pH of the aqueous suspension of modified inorganic oxide is increased from the treatment pH of 2.5 or less to a pH from 3.0 to 10.0. Typically, the pH of the resulting aqueous suspension is increased to 3 or higher, preferably, 4 or higher, more preferably, 5 or higher and most preferably, 6 or higher and usually 10 or less, preferably 9 or less, more preferably 8 or less and most preferably 7 or less. The pH of the aqueous suspension may range between any combination of these levels, including the recited levels. This is done to neutralize the added or generated acidity and produce a final product (after drying) having a pH of from 5.0 to 10.0.

The modified inorganic oxide is recovered by filtering and drying or by contacting the aqueous suspension of modified inorganic oxide with a water immiscible organic solvent at a solvent to inorganic oxide weight ratio greater than 1 to 1, preferably greater than 5 to 1. The modified inorganic oxide recovered in the solvent phase may be used without further treatment or dried. One contemplated embodiment of the present invention is a composition comprising a slurry of the modified filler in a water-immiscible solvent. The concentration of the modified filler in the slurry may range from 1 to 90 weight percent based on the total weight of the slurry.

Examples of useful water-immiscible organic solvents include low molecular weight siloxanes, such as hexamethyldisiloxane, octamethylcyclotetrasiloxane, diphenyltetramethyldisiloxane and trimethylsiloxy endblocked polydimethylsiloxane fluids. When a siloxane is employed as a solvent, it may serve both as a solvent and as a reactant with the inorganic oxide. In addition, useful water-immiscible organic solvents include aromatic hydrocarbons, such as toluene and xylene; heptane and other aliphatic hydrocarbon solvents; cycloalkanes, such as cyclohexane; ethers, such as diethylether and dibutylether; halohydrocarbon solvents, such as methylene chloride, chloroform, ethylene chloride, and chlorobenzene; and ketones, such as methylisobutylketone.

The water-immiscible organic solvent which is used to contact the aqueous suspension of hydrophobic particulate inorganic oxide may or may not contain one or more materials dissolved therein, as is desired. Examples of such materials include, but are not limited to, one or more rubbers, oil, coupling agent, antioxidant, and accelerator.

The modified filler of the present invention (as a powder, granule, pellet, slurry, aqueous suspension or solvent suspension) may be combined with base material, i.e., material used in the product to be manufactured, to form a mixture referred to as a master batch. In the master batch, the modified filler may be present in a higher concentration than in the final product. Aliquots of this mixture are typically added to production-size quantities during mixing operations in order to aid in uniformly dispersing very small amounts of such additives to polymeric compositions, e.g., plastics, rubbers and coating compositions.

The modified filler may be combined with emulsion and/or solution polymers, e.g., organic rubber comprising solution styrene/butadiene rubber (SBR), polybutadiene rubber or a mixture thereof, to form a master batch. One contemplated embodiment of the present invention is a master batch comprising a combination of organic rubber, water-immiscible solvent, modified filler and optionally, processing oil. Such a product may be supplied by a rubber producer to a tire manufacturer. The benefit to the tire manufacturer of using a master batch is that the modified filler is uniformly dispersed in the rubber, which results in minimizing the mixing time to produce the compounded rubber. The master batch may contain from 10 to 150 parts of modified filler per 100 parts of rubber (phr), preferably, from 20 to 130 phr, more preferably, from 30 to 100 phr, and most preferably, from 50 to 80 phr.

In a further embodiment of the present invention, there is contemplated a polymeric article having dispersed therein from 10 to 150 parts of modified filler per 100 parts of polymer, preferably from 20 to 130, more preferably, from 30 to 100, and most preferably from 50 to 80 parts of modified filler per 100 parts of polymer. Alternatively, the amount of modified filler may range between any combination of these values, inclusive of the recited ranges. As described herein, the polymer may be selected from the group consisting of thermoplastic resins, thermosetting resins, organic rubber and silicone rubber. Preferably, the polymer is a curable organic rubber.

Curable rubbers principally contemplated for use in combination with the modified filler of the present invention are well known to the skilled artisan in rubber chemistry and include vulcanizable and sulfur-curable rubbers. Particularly contemplated are those which are typically used for mechanical rubber goods.

The modified filler of the present invention can be mixed with an uncured rubbery elastomer used to prepare the vulcanizable rubber composition by conventional means such as in a Banbury mixer or on a rubber mill at temperatures between about 100° F. and 300° F. (38° C.–150° C.). A vulcanizable rubber composition may contain, based on 100 parts of vulcanizable rubber polymer, from 10 to 150 parts of modified filler, preferably, from 20 to 130 phr, more preferably, from 30 to 100 phr, and most preferably, from 50 to 80 phr. Other conventional rubber additives present are the conventional sulfur or peroxide cure systems.

The sulfur-cure system can include 0.5 to 3 parts sulfur, 2 to 5 parts zinc oxide and 0.5 to 2 parts accelerator. The peroxide-cure system can include 1 to 4 parts of a peroxide such as dicumyl peroxide. Other conventional rubber additives can also be used. Such additives include other fillers, such as carbon black, oils, plasticizers, accelerators, antioxidants, heat stabilizers, light stabilizers, zone stabilizers, organic acids such as for example stearic acid, benzoic acid, or salicylic acid, other activators, extenders and coloring pigments. The particular compounding recipe will vary with the particular vulcanizate prepared; but, such recipes are well-known to those skilled in the rubber compounding art.

The vulcanizable rubber composition is vulcanized or cured to a rubber vulcanizate in accordance with customary procedures known in the rubber industry. Exemplification of industrial rubber vulcanizates (articles) which can be produced utilizing the modified filler of the present invention include wire and cable jacketing, hoses, gaskets and seals, industrial and automotive drive-belts, engine mounts, V-belts, conveyor belts, roller coatings, tires and components of tires, such as vehicle tire treads, subtreads, tire carcasses, tire sidewalls, tire belt wedge, tire bead filler, and tire wire skim coat, shoe sole materials, packing rings, damping elements and many others.

The present invention is more particularly described in the following discussion of the Standard Compound Protocol, Examples and Comparative Examples which are intended as illustrative only since numerous modifications and variations therein will be apparent to those skilled in the art.

Standard Compounding Protocol

The Standard Compounding Protocol was used to prepare test samples of formulated rubber compositions containing the silica of the Examples and Comparative Examples (CE).

Part A

The following ingredients in amounts of parts per hundred parts of rubber by weight (phr) were added in the order described to a polyethylene bag held erect in a 500-milliliter (mL) plastic cup:

| Material | Amount (phr) |
| --- | --- |
| Processing oil [1] | 30.0 |
| Zinc oxide [2] | 2.5 |
| Antiozonant [3] | 2.0 |
| Stearic acid [4] | 1.0 |
| Silica Sample | 12.5 |

[1] Sundex ® 8125 aromatic hydrocarbon processing oil, obtained commercially from Sun Company, Inc., Refining and Marketing Division.
[2] Kadox ® surface treated zinc oxide, obtained commercially from Zinc Corporation of America.
[3] Wingstay ® 100 antiozonant, a mixture of diaryl p-phenylenediamines, obtained commercially from The Goodyear Tire & Rubber Co.
[4] Rubber grade stearic acid, obtained commercially from C. P. Hall.

Part B

A 1.89 liter (L) Farrel Banbury mixer (Model "BR") was used for mixing the various ingredients. Immediately prior to adding the batch ingredients to the mixer, 800 grams (g) of CV-60 grade natural rubber was put through the mixer to clean it of any residue of previous runs and increase the temperature to about 93° C. (200° F.). After removing the rubber, the mixer was cooled to about 65° C. (150° F.) before adding the ingredients to produce the rubber test sample.

A rubber composition is prepared using the test silica, the following other enumerated ingredients and the procedure described hereinafter.

| Ingredient | Amount (phr) | Time at which material was added to or (removed from) mixer in minutes | Rotor speed (rpm) |
| --- | --- | --- | --- |
| First Pass | | | |
| SBR Rubber [5] | 70.0 | 0 | 116 |
| BR Rubber [6] | 30.0 | 0 | 116 |
| Test Silica | 57.5 | 0.5 | 116 |
| Sample from Part A | All | 3.0 | 116 |
| Dump contents | | ((5.0)) | |
| Second Pass | | | |
| Product of First Pass | All | 0 | 77 |
| Antiozonant [7] | 2.0 | 0 | 77 |
| Petroleum Wax [8] | 1.5 | 0 | 77 |
| RM Sulfur [9] | 1.4 | 0.5 | 77 |
| TBBS [10] | 1.7 | 0.5 | 77 |
| DPG [11] | 2.0 | 0.5 | 77 |
| Dump contents | | ((4.0)) | |

[5] Solflex ® 1216 solution styrene-butadiene rubber (SBR) obtained commercially from The Goodyear Tire & Rubber Co.
[6] Budene 1207 butadiene rubber (BR) obtained commercially from The Goodyear Tire & Rubber Co.
[7] Santoflex ® 13 antiozonant, described as N-(1,3-dimethylbutyl)-N'-phenyl-p-phenylenediamine, obtained commercially from Flexsys.
[8] Okerin ® 7240 microcrystalline wax/paraffin wax blend obtained commercially from Astor Corporation.
[9] Rubber Makers (RM) sulfur, 100% active, obtained commercially from Taber, Inc.
[10] N-tert-butyl-2-benzothiazolesufenamide, obtained commercially from Monsanto.
[11] Diphenylguanidine, obtained commercially from Monsanto.

The first pass was initiated by adding the rubber, viz., SBR and BR, to the mixer and mixing for 0.5 minute at 116 rpm. The rotor speed was maintained at 116 rpm and 57.5 phr of the treated silica sample was added. After a further 1.5 minute, the ram was raised and the chute swept, i.e., the covering on the entry chute was raised and any material that was found in the chute was swept back into the mixer. After a further minute, the sample from Part A was added. After another minute, the ram was raised and the chute swept. The contents in the mixer were mixed for an additional minute to achieve a maximum temperature in the range of from 145 to 150° C. (293 to 302° F.) and to complete the first pass in the mixer. Depending upon the type of sample, the rotor speed of the mixer may be increased or decreased after 4 minutes to achieve a temperature in the foregoing range within the specified mixing period.

After completing the first pass, the temperature of the material was determined with a thermocouple to verify that it did not exceed the maximum temperature of 150° C. The removed material was weighed and sheeted in a Farrel 12 inch two-roll rubber mill at 2.032 mm±0.127 mm (0.080 inch±0.005 inch). The resulting milled stock was cut into strips in preparation for the second pass in the mixer.

A minimum of one hour was allotted between the completion of the first pass in the mixer and the beginning of the second pass to allow the milled stock to cool. If necessary, the aforedescribed cleaning and warming-up procedure using CV-60 grade natural rubber was completed prior to initiating the second pass. The temperature of the mixer was adjusted to approximately 49° C.(120° F.). With the cooling water running, the second pass was initiated by adding the strip of first pass stock to the mixer operating at 77 rpm and the preweighed combination of Santoflex® 13 antiozonant and Okerin® 7240 microcrystalline wax/paraffin wax blend. After 0.5 minutes, the second addition of the combination of RM Sulfur, TBBS and DPG was added. After a further 1.5 minutes, the ram was raised and the chute swept. The second pass was completed by mixing the stock an additional 2.0 minutes while maintaining the temperature at or below 125° C. (257° F.).

Part C

A Farrel 12 inch two-roll rubber mill was heated to approximately 60° C. (140° F.). The stock from the second pass of Part B was fed into the running mill with a nip setting of 2.032 mm±0.127 mm (0.080 inch±0.005 inch). The resulting sheet was placed on a flat surface until the temperature of the sheet reached room temperature. Typically, the sheet cooled within about 30 minutes. Afterwards, the milled sheet was fed into the rubber mill with a nip setting of 3.81 mm±0.51 mm (0.15 inch±0.02 inch). The rolling bank was adjusted, if necessary, to maintain a uniform thickness. The resulting material was subjected to 16 side cuts and then 8 end passes. The rubber mill nip was adjusted to produce a sheet thickness of 2.032 mm±0.127 mm (0.080 inch±0.005 inch). The sheet stock collected off the mill was placed on a flat clean surface. Using a stencil, a rectangular sample 203.2 mm×152.4 mm (8 inches×6 inches) was cut from the sheet stock. The sample was conditioned, i.e., stored between clean polyethylene sheets and maintained for 15 to 18 hours at a temperature of 23°±2° C., and a relative humidity of 50%±5%.

After conditioning, the sample was placed in a 203.2 mm×152.4 mm×2.286 mm (8 inch×6 inch×0.09 inch) standard frame machine steel compression mold having a polished surface. The sample was cured in a 61 centimeter×61 centimeter (24 inch×24 inch) 890 kilonewton (100 ton) 4-post electrically heated compression press, for T90, i.e., the time it takes for 90 percent of the cure to occur, in accordance with ASTM D-2084, plus 5 minutes at 150° C.(302° F.) under a pressure of 13.79 megapascals (2000 pounds per square inch). Typically, curing was completed within about 10 minutes. The resulting cured rubber sheet was removed from the mold and maintained for 15 to 18 hours at a temperature of 23°±2° C. (73.4±3.6° F.), and a relative humidity of 50%±5% prior to testing in Part D.

Part D

Testing was performed in accordance with ASTM D 412-98a—Test Method A. Dumbbell test specimens were prepared using Die C. An Instron model 4204 with an automated contact extensiometer for measuring elongation was used. The cross-head speed was found to equal 508 mm/min. All calculations were done using the Series IX Automated Materials Testing software supplied by the manufacturer. The Tensile Stress at 300% elongation (in MPa) for samples prepared using the Standard Compounding Protocol was reported as the Standard Tensile Stress at 300% elongation (STS @ 300%) in Table 3.

PREPARATION OF PRECIPITATED SILICA

A precipitated silica was produced by acidifying a sodium silicate solution with sulfuric acid. The majority of the precipitate was formed at a pH above 8.5. Further precipitate was produced by continuing the acid addition until the solution pH reached a level of about 3.5.

A sample of the precipitated silica for surface area analysis, as described in Example 9, was prepared by filtering and washing a portion of the silica until the rinse water demonstrated a conductivity level of from about 300 to 800 micromhos. The resulting filter cake was re-liquefied using a high shear agitator to form a solid in liquid suspension. The suspension was dried in a Niro spray drier (inlet temperature about 360° C. and the outlet temperature about 110° C.). Listed in Table 1 are the surface areas of the precipitated silicas used to prepare the modified silicas of the Examples and Comparative Examples.

EXAMPLES 1–2

Approximately 40 kilograms (kg) of a precipitated silica suspension of which about 5.2 kg is silica and about 11.7 kg of isopropyl alcohol were added to a 30 gallon glass lined vessel having a bottom drain. The vessel was also equipped with a temperature recorder, mechanical stirrer, means for heating and a condenser.

While the contents of the vessel were stirred and heating initiated, Si-69 reinforcing agent, referred to herein as TESPT, was added over an interval of time (typically, about 10 minutes) that would yield the approximate amounts listed for weight percent of TESPT per silica on a dry basis for the examples listed in Table 3. After completion of the TESPT addition, dimethyldichlorosilane (DMDCS) was added in an identical manner to yield the approximate amounts listed for weight percent of DMDCS per silica on a dry basis in Table 3. The weight ratios of TESPT/DMDCS is also listed in Table 3. The resulting pH of the solutions was about 0.8.

After completion of the DMDCS addition, the mixture was heated to about 68° C. and held at this temperature for about 10 minutes. While cooling, enough toluene (typically 15 kg) was added to the stirred mixture to effect separation of the hydrophobic precipitated silica from the aqueous phase without forming an emulsion. The aqueous phase was drained from the vessel. The stirred mixture in the vessel containing the hydrophobic precipitated silica was then washed twice with about 30 kg for Example 1 and about 40 kg for Example 2 of water containing about 400 grams for Example 1 and 500 grams for Example 2 of sodium bicarbonate. The aqueous phase was drained.

After washing was completed, enough additional toluene (about 13.9 kg for Example 1 and 23.7 kg for Example 2) was added to the stirred mixture to make a flowable solid-in-liquid suspension that could be easily discharged from the vessel. The resulting suspension was dried in a rotocone drier under vacuum (minimum 23 inches of mercury) at a minimum of 140° C. Drying was continued until the samples showed a wt. % loss of less than 4.5% when exposed to 160° C. for 10 minutes.

EXAMPLE 3–8

Approximately 19 kg of a precipitated silica suspension of which about 1.5 kg is silica was added to a 40 liter glass vessel having a bottom drain. The vessel was also equipped with a temperature recorder, mechanical stirrer, means for heating and a condenser.

While the contents of the vessel were stirred, about 1 weight percent per silica on a dry basis of the surfactant listed in Table 2 was added. After completion of the surfactant addition, the resulting mixture was stirred for 5 minutes. TESPT was added over a 5 minute interval to the stirred mixture to yield about 10 weight percent of TESPT per silica on a dry basis. The resulting pH of the solution was about 3.0. After completion of the TESPT addition, dimethyldichlorosilane (DMDCS) was added in an identical manner to yield about 15 weight percent of DMDCS per silica on a dry basis. The resulting pH of the solution ranged from about 0.9 to 1.6. The mixture was heated to from about 61 to 68° C. and held at this temperature for typically about 20 minutes. The suspensions of Examples 5 and 8 were heated for about 40 and about 16 minutes, respectively. While cooling, enough 50 wt. % NaOH was added to the mixture over an interval of time (typically 10–15 minutes) to adjust the pH to about 7.0. 20 L of the stirred mixture containing the hydrophobic precipitated silica was discharged from the vessel, vacuum filtered using a Buchner funnel and then washed three times with about 8 kg of water each wash. After washing was completed, enough deionized water and high shear agitation was applied to the filter cake to make a flowable solid in liquid suspension. The resulting suspension was spray dried in a Niro spray drier (inlet temperature about 400° C. and the outlet temperature about 150° C.) to form the treated silica samples of Examples 3–8.

Comparative Examples 1–3

17 L of the untreated precipitated silica used in Examples 1–2 containing 820 grams of silica was added to a vessel equipped with a mechanical stirrer. The pH of the slurry before treatment was about 6.5. While the stirrer was mixing the suspension, enough TESPT was added to yield the approximate amount listed for weight percent of TESPT per silica on a dry weight basis for Comparative Examples 1–3 listed in Table 3. The resulting treated suspensions were dried in a Niro spray drier (inlet temperature about 360° C. and the outlet temperature about 110° C.).

EXAMPLE 9

The surface area of the treated and untreated test silica samples of Examples 1–8 and Comparative Examples(CE) 1–3 was determined using a Horiba 6200 series instrument by a dynamic single point surface area technique, ASTM D3037-93, Procedure C (modified). This procedure simulates the Brunauer-Emmett-Teller (BET) method at $P/P_o =$ 0.294 using 30% nitrogen-in-helium as the adsorbate gas. The ASTM procedure was modified as follows: a 30% nitrogen-in-helium gas mixture was used; a flow of approximately 40 mL/min was maintained; samples were dried in the analysis cells under a flow of nitrogen at 180±5° C. for one hour; and the adsorbed nitrogen on the sample was desorbed by removing the dewar of liquid nitrogen and allowing the sample to warm to room temperature with no external heat source. Results for the untreated test silica samples are listed in Table 1 and for the treated test silica samples are listed in Table 4.

The percent carbon was determined by CHN analysis using a Carlo Erba model 1106 elemental analyzer. A 1–2 mg sample in a sealed tin capsule was burned in an oxygen enriched atmosphere at 1040° C. with a Helium carrier, quantitatively combusted over $Cr_2O_3$, then the combustion gases were passed over Cu at 650° C., to eliminate the excess oxygen and reduce the oxides of nitrogen to nitrogen. The gases were then passed through a chromatographic column, separated and eluted as $N_2$, $CO_2$, and $H_2O$. The eluted gases were measured by a thermal conductivity detector. The instrument was calibrated by combustion of standard compounds. Results are listed in Table 4.

The percent sulfur was determined by x-ray fluorescence spectrometry (XRF), using a Rigaku RIX 2000 wavelength-dispersive spectrometer. Samples were briquetted into aluminum support cups at 344.75 megapascals (25 tons/in$^2$) pressure after mixing with SpectroBlend® binder (Chemplex Industries, Tuckahoe, N.Y.) in a 1:1 weight ratio. NIST- and NBS-traceable secondary standards (PPG production silicas, or equivalent) were used for the empirical XRF calibration. Detection was via a gas-proportional flow counter using a germanium crystal monochromator. Results are listed in Table 4.

The Silane Conversion Index reported as SCI in Table 4 was determined by solid state $^{29}Si$ NMR. This data was collected at ambient temperature on a Bruker AM-300 NMR with a narrow bore magnet and a Doty 7 mm standard speed MAS probe. Samples were packed into 7 mm o.d. zirconia rotors and sealed with short Kel-F caps. The rotors were spun at the Magic Angle with a speed of about 5.0 kHz. Cross Polarization (CP/MAS) data was collected using a 90° $^1H$ pulse, 5600–8400 scans per spectrum, a 5 msecond contact time, high power proton decoupling during data acquisition, and a 3 second relaxation delay. Hartmann-Hahn conditions were achieved using a kaolinite sample (J. Rocha and J. Klinowski, *J. Magn. Reson.*, 90, 567 (1990)). All chemical shifts were referenced externally to tetramethylsilane (TMS).

All spectra were analyzed using a nonlinear curve fitting program (LINESIM) on an Aspect 3000 computer to determine the relative area % for the $T^1$ (–49 ppm), $T^2$ (–57 ppm), and $T^3$ (–65 ppm) peaks. Area % values for $T^1$, $T^2$, and $T^3$ were determined by curve fitting over the region of –30 ppm to –80 ppm.

pH determinations were made on the treated silicas of the Examples and Comparative Examples by the following procedure: add 5.0 g of silica (in powder form) to a 150 mL beaker containing a magnetic stir bar; add 50 mL of isopropanol and 50 mL of deionized water; and stir vigorously without splashing until the silica is suspended. Place a calibrated pH electrode in the vigorously stirring solution and record the pH reading after one minute (±5 sec). The results are listed in Table 4.

The Soxhlet Extractable percent carbon of the treated silica of Example 1 was determined by adding 5.44 grams of the material to a 43 mm×123 mm (internal diameter× external length) cellulose extraction thimble which was placed into an appropriately sized Soxhlet extraction tube which was fitted with a condenser. This Soxhlet extractor and condenser system was attached to a round bottom flask containing 700 mL of toluene. The flask heated to the reflux temperature of the toluene. After refluxing for 25 hours, the used toluene was replaced with unused toluene and refluxing was continued for 22.5 hours. The resulting extracted treated silica was recovered and dried until a sample showed a 1.0 weight percent loss when exposed to 160° C. for 10 minutes. The percent carbon of the extracted sample was determined using the procedure described herein. The Soxhlet extractable percent carbon was determined using the following equation:

$$\frac{(\% \text{ carbon before extraction}) - (\% \text{ carbon after extraction})}{(\% \text{ carbon before extraction})} \times 100$$

The percent carbon before extraction was 3.50 and the percent carbon after extraction was 3.02. Therefore, the Soxhlet Extractable percent carbon of the treated silica of Example 1 was 13.7.

TABLE 1

| Untreated Silica Used in Examples | Surface Area M$^2$/g |
|---|---|
| 1-2 & CE1-3 | 198 |
| 3-8 | 180 |

TABLE 2

| Example No. | Surfactant |
|---|---|
| 3 | MAFO ® CAB[12] |
| 4 | MASIL ® SF 19[13] |
| 5 | AVANEL ® N-1525/90[14] |
| 6 | MACOL ® 48[15] |
| 7 | BRIJ ® 35[16] |
| 8 | ETHOMEEN 18/60[17] |

[12] A amphoteric surfactant, reported to be based on cocamidopropyl aminobetaine, available from BASF.
[13] A nonionic surfactant, reported to be based on ethoxylated silicone, available from BASF.
[14] A nonionic surfactant, reported to be based on an alkylchloride end-capped ethylene oxide, available from BASF.
[15] A nonionic surfactant, reported to be based on glycol ether, available from BASF.
[16] A nonionic surfactant, reported to be based on an polyoxethylene lauryl ether, available from Aldrich Chemical Co.
[17] A nonionic/cationic, reported to be based on ethoxylated (50) stearylamine, available from AKZO Chemical, Inc.

TABLE 3

| Example # | % TESPT/SiO$_2$ | % DMDCS/SiO$_2$ | Ratio TESPT/DMDCS |
|---|---|---|---|
| 1 | 10.0 | 15.0 | 0.67:1 |
| 2 | 10.0 | 15.0 | 0.67:1 |
| 3 | 10.0 | 15.0 | 0.67:1 |
| 4 | 10.0 | 15.0 | 0.67:1 |
| 5 | 10.0 | 15.0 | 0.67:1 |
| 6 | 10.0 | 15.0 | 0.67:1 |
| 7 | 10.0 | 15.0 | 0.67:1 |
| 8 | 10.0 | 15.0 | 0.67:1 |
| CE1 | 5.0 | 0.0 | 5:0 |
| CE2 | 7.5 | 0.0 | 7.5:0 |
| CE3 | 10.0 | 0.0 | 10:0 |

TABLE 4

| Example # | Surface Area (m²g) | pH | Carbon (wt. %) | Sulfur (wt. %) | SCI** | STS @ 300%*** |
|---|---|---|---|---|---|---|
| 1 | 126 | 7.2 | 3.5 | 1.78 | ND* | 9.4 |
| 2 | 124 | 7.4 | 3.4 | 1.50 | 0.53 | 9.9 |
| 3 | 114 | 9.1 | 3.7 | 1.12 | ND* | 8.0 |
| 4 | 112 | 8.3 | 3.6 | 1.09 | ND* | 7.7 |
| 5 | 115 | 9.4 | 3.5 | 1.32 | ND* | 7.8 |
| 6 | 124 | 8.4 | 2.3 | 0.83 | ND* | 8.0 |
| 7 | 111 | 9.5 | 3.8 | 1.12 | ND* | 7.1 |
| 8 | 104 | 8.4 | 3.8 | 1.36 | ND* | 8.1 |
| CE 1 | 167 | 6.7 | 0.7 | 0.77 | ND* | 3.6 |
| CE 2 | 153 | 6.9 | 1.3 | 1.25 | ND* | 6.1 |
| CE 3 | 148 | 6.9 | 1.7 | 1.60 | 0.06 | 6.2 |

ND* indicates that the test was not done.
SCI** represents the Silane Conversion Index.
STS @ 300%*** represents the Standard Tensile Stress @ 300% elongation.

The results of Table 1 show that the untreated silicas used in the process of producing the modified silicas of the Examples and Comparative Examples had a surface area that ranged from 180 to 198 m²/g.

The results of Table 4 show that the treated silica samples of the present invention demonstrated a Standard Tensile Stress @ 300% elongation of at least 7.0, a Carbon weight percent of greater than 1.0, a Sulfur weight percent greater than 0.1 and a Silane Conversion Index greater than 0.3.

Comparative Example 1 had a Carbon weight percent lower than the required amount and demonstrated an STS @ 300% of 3.6. Both Comparative Examples 2 and 3 had carbon and sulfur levels within the necessary ranges, but both had an STS @ 300% of less than 7.0. Comparative Example 3 also had a SCI value less than the required value.

Although the present invention has been described with references to specific details of certain embodiments thereof, it is not intended that such details should be regarded as limitations upon the scope of the invention except in so far as they are included in the claims.

I claim:

1. A chemically modified filler comprising amorphous or particulate inorganic oxide characterized by:
    (a) a carbon content of greater than 1 weight percent;
    (b) a sulfur content of greater than 0.1 weight percent;
    (c) a Silane Conversion Index of at least 0.3; and
    (d) a Standard Tensile Stress at 300 percent elongation of at least 7.

2. The chemically modified filler of claim 1 wherein the carbon content is at least 1.5 weight percent; the sulfur content is at least 0.3 weight percent; the Silane Conversion Index is at least 0.4; and the Standard Tensile Stress at 300 percent elongation is at least 7.5.

3. The chemically modified filler of claim 2 wherein the inorganic oxide is precipitated silica, the carbon content is at least 2 weight percent; the sulfur content is at least 0.6 weight percent; the Silane Conversion Index is at least 0.5; and the Standard Tensile Stress at 300 percent elongation is at least 8.

4. The chemically modified filler of claim 1 wherein said filler is further characterized by a modified BET surface area of from 20 to 350 m²/g.

5. The chemically modified filler of claim 3 wherein the modified BET surface area is from 100 to 200 m²/g.

6. The chemically modified filler of claim 1 wherein said filler is further characterized by a pH of from 5 to 10.

7. The chemically modified filler of claim 5 wherein the pH is from 6.0 to 7.5.

8. The chemically modified filler of claim 1 wherein said filler is further characterized by a Soxhlet Extractable percent carbon of less than 30 percent.

9. The chemically modified filler of claim 7 wherein the Soxhlet Extractable percent carbon is less than 20 percent.

10. The chemically modified filler of claim 1 wherein the inorganic oxide is selected from kaoline, clay, diatomaceous earth, aluminum oxide, aluminum hydroxide, aluminum trihydrate, titanium dioxide, aluminosilicate, pyrogenic silica, colloidal silica, precipitated silica or mixtures of such inorganic oxides.

11. The chemically modified filler of claim 10 wherein the inorganic oxide is aluminosilicate, colloidal silica, precipitated silica or mixtures thereof.

12. The chemically modified filler of claim 11 wherein the inorganic oxide is precipitated silica.

13. A slurry comprising a combination of water immiscible organic solvent and from 1 to 90 weight percent of amorphous or particulate inorganic oxide characterized by:
    (a) a carbon content of greater than 1 weight percent;
    (b) a sulfur content of greater than 0.1 weight percent;
    (c) a Silane Conversion Index of at least 0.3; and
    (d) a Standard Tensile Stress at 300 percent elongation of at least 7.

14. The slurry of claim 13 wherein the water immiscible solvent is selected from the group consisting-of aliphatic hydrocarbons, aromatic hydrocarbons, cycloalkanes, halohydrocarbon solvents and ketones.

15. The slurry of claim 13 wherein said inorganic oxide is precipitated silica and is further characterized by a modified BET surface area of 20 to 350 m²/g, a pH of from 5 to 10, and a Soxhlet Extractable percent carbon of less than 30 percent.

16. A master batch comprising a combination of organic rubber, water immiscible solvent and from 10 to 150 parts per 100 parts of organic rubber of amorphous or particulate inorganic oxide characterized by:
    (a) a carbon content of greater than 1 weight percent;
    (b) a sulfur content of greater than 0.1 weight percent;
    (c) a Silane Conversion Index of at least 0.3; and
    (d) a Standard Tensile Stress at 300 percent elongation of at least 7.

17. The master batch of claim 16 wherein the organic rubber comprises solution styrene/butadiene rubber, polybutadiene rubber or mixtures thereof.

18. A polymeric article having dispersed therein from 10 to 150 parts per 100 parts of polymer of amorphous or particulate inorganic oxide characterized by:
    (a) a carbon content of greater than 1 weight percent;
    (b) a sulfur content of greater than 0.1 weight percent;
    (c) a Silane Conversion Index of at least 0.3; and
    (d) a Standard Tensile Stress at 300 percent elongation of at least 7.

19. The polymeric article of claim 18 wherein the polymer is selected from the group consisting of thermoplastic resins, thermosetting resins, organic rubber and silicone rubber.

20. The polymeric article of claim 19 wherein the polymer is a curable organic rubber.

21. The polymeric article of claim 18 wherein said inorganic oxide is precipitated silica and is further characterized by a modified BET surface area of 20 to 350 m²/g, a pH of from 5 to 10, and a Soxhlet Extractable percent carbon of less than 30 percent.

22. The polymeric article of claim 21 wherein the polymer is a curable organic rubber comprising solution styrene/butadiene rubber, polybutadiene rubber or mixtures thereof.

23. The polymeric article of claim 22 wherein the article is a tire.

* * * * *